United States Patent [19]

Tojyo et al.

[11] 4,116,753

[45] Sep. 26, 1978

[54] METHOD FOR THE MANUFACTURE OF OPTICAL MOLD FOR REPRODUCING CURVED SURFACES HAVING THE SAME SHAPE AS AN OPTICAL PROTOTYPE

[75] Inventors: Tsutomu Tojyo; Shozo Sato, both of Hachiouji, Japan

[73] Assignee: Olympus Optical Co., Ltd., Tokyo, Japan

[21] Appl. No.: 804,242

[22] Filed: Jun. 7, 1977

[30] Foreign Application Priority Data

Jun. 14, 1976 [JP] Japan ................................. 51-69593
Jun. 14, 1976 [JP] Japan ................................. 51-69594

[51] Int. Cl.$^2$ ...................... B32B 17/00; B32B 7/12; B32B 15/00
[52] U.S. Cl. .................................. 156/629; 156/155; 156/232; 156/233; 156/236; 156/249; 156/630; 156/656; 249/135; 264/1; 264/220; 425/808
[58] Field of Search ............... 196/629, 630, 656, 232, 196/233, 236, 241, 249, 155; 264/1, 220, 221; 249/116, 135; 429/808

[56] References Cited

U.S. PATENT DOCUMENTS

| 2,164,010 | 6/1939 | Grupe | 156/155 X |
|---|---|---|---|
| 2,734,243 | 2/1956 | Lips et al. | 264/220 UX |
| 2,765,248 | 10/1956 | Beech et al. | 156/232 |
| 2,851,331 | 9/1958 | Miller | 249/116 |
| 2,879,196 | 3/1959 | Brucker | 156/155 |
| 3,428,533 | 2/1969 | Pichel | 264/1 UX |
| 4,061,518 | 12/1977 | Burroughs et al. | 264/1 X |

*Primary Examiner*—William A. Powell
*Assistant Examiner*—Thomas Bokan
*Attorney, Agent, or Firm*—Cushman, Darby & Cushman

[57] ABSTRACT

A sturdy optical mold for reproducing optical curved surfaces in the shape corresponding to that of an optical prototype comprising a resin layer formed on a base and a metallic layer formed on said resin layer, and a method for manufacturing an optical mold for reproducing optical curved surfaces in the shape corresponding to that of an optical prototype comprising forming layers of different metals on the surface of an optical prototype, dissolving one of said layers for releasing the other layer and fixing said released layer onto a base with a bonding agent.

4 Claims, 15 Drawing Figures

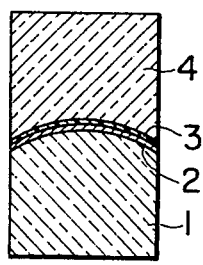
FIG. 1
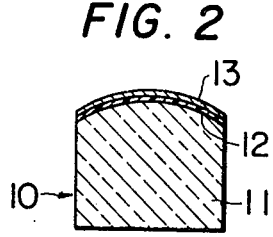
FIG. 2
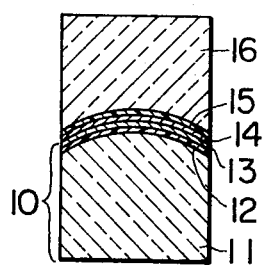
FIG. 3
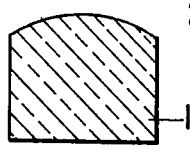
FIG. 4A
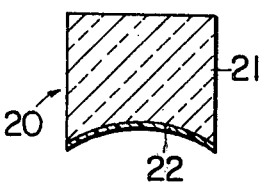
FIG. 4B
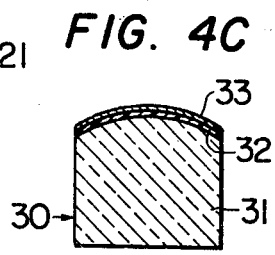
FIG. 4C
FIG. 4D
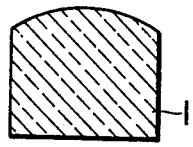
FIG. 5A
FIG. 5B
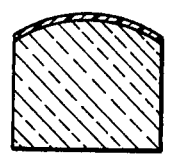
FIG. 5C

METHOD FOR THE MANUFACTURE OF OPTICAL MOLD FOR REPRODUCING CURVED SURFACES HAVING THE SAME SHAPE AS AN OPTICAL PROTOTYPE

BACKGROUND OF THE INVENTION

1. Field of the Invention

The present invention relates to an optical mold for replicating or reproducing curved optical surfaces having the corresponding shape to that of a prototype and manufacturing methods therefor.

2. Description of the Prior Art

In reproducing curved optical surfaces having the corresponding shape to that of an optical prototype by conventional method, such curved surfaces are reproduced on glass base directly from an optical prototype. Speaking more concretely with reference to FIG. 1 attached hereto, a curved optical surface is reproduced by forming a layer of release agent 2 on the surface of an optical prototype 1, further forming a layer 3 of photopolymerizable bonding agent or resin, bringing a base 4 made of glass into contact with said layer 3, thereafter hardening said layer 3 of bonding agent or resin (hardening photopolymerizable material by irradiating it with rays) and then detaching said layer from said optical prototype 1 to obtain the resin layer 3 having the curved surface corresponding to that of said optical prototype on the surface of said glass base. However, such a conventional manufacturing method has drawbacks that said optical prototype is made of glass and is therefore easily cracked, and that delicate care is required to release a reproduced optical surface from the prototype since both of said prototype and base are made of glass materials which have little difference in their coefficients of expansion. In addition, it is necessary to prepare numerous optical prototypes for reproducing a large number of optical curved surfaces. However, it is never easy to prepare numerous optical prototypes, for example, having a non-spherical surface for reproducing optical elements having non-spherical optical surfaces. As is understood from the above descriptions, the conventional method for reproducing optical curved surfaces directly from an optical prototype is disadvantageous for mass production.

SUMMARY OF THE INVENTION

A primary object of the present invention is to provide a sturdy optical mold which is reproduced from an optical prototype, and comprises a layer of a bonding agent and a protective layer of a metal both of which are in the shape corresponding to the curved surface of an optical prototype (in the same shape as the curved surface of an optical prototype for reproducing concave optical surfaces) on a base made of glass or the similar material.

Another object of the present invention is to provide methods for manufacturing an optical mold comprising plating two layers of different metals consecutively on the surface of an optical prototype, dissolving and removing one of said metal layers, and bonding the other layer onto the surface of a base.

BRIEF DESCRIPTION OF THE DRAWINGS

FIG. 1 shows a diagram illustrating the conventional method for reproducing optical curved surfaces;

FIG. 2 shows a sectional view of the optical mold according to the present invention;

FIG. 3 shows a diagram illustrating the method for reproducing an optical curved surface by using the optical mold according to the present invention;

FIG. 4A through FIG. 4D show diagrams illustrating the method for manufacturing an optical mold having a convex surface (for reproducing optical concave surfaces) according to the present invention;

FIG. 5A through FIG. 5C show diagrams for manufacturing an optical mold having a concave surface (for reproducing convex optical surfaces) according to the present invention;

DESCRIPTION OF THE PREFERRED EMBODIMENTS

Figure 6A:
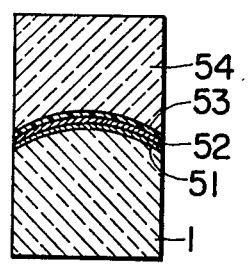
FIG. 6A and FIG. 6B show diagrams illustrating the method for manufacturing an optical mold having a concave surface according to the present invention.

Now, the optical mold according to the present invention and methods for reproducing optical curved surfaces by using said mold will be described with reference to the accompanying drawings.

In FIG. 2, the reference numeral 10 represents an optical mold according to the present invention comprising a base 11 made of glass on which a layer 12 of bonding agent or resin is formed. Said layer 12 has a curved surface which corresponds to that of an optical prototype manufactured by the conventional method described with reference to FIG. 1. The reference numeral 13 designates a protective film of metal formed on the surface of said layer 12. The protective metallic film 13 may be formed, for example, by plating a layer of chromium directly onto the layer 12, or plating a layer of copper and further plating a layer of chromium over the surface of the layer 12. In order to reproduce optical curved surface by using the optical mold according to the present invention, a reproducing base 16 coated with a layer 15 of bonding agent or resin is bonded to the surface of the optical mold 10, i.e., the surface of the protective film 13 with a release agent 14 disposed therebetween, and then said base is detached from the optical prototype 1. An optical curved surface which corresponds to that of the optical mold, i.e., optical curved surface of the prototype can be reproduced in this way.

Now, a method for manufacturing an optical mold will be described below:

FIG. 4A through FIG. 4D illustrate processes to manufacture an optical mold having a convex surface, whereas FIG. 5A through FIG. 5C show process to prepare an optical mold having a concave surface. In case where an optical concave surface is to be reproduced, an optical mold must have a convex surface. For manufacturing such an optical mold, a glass base 21 coated on the surface with a layer of bonding agent or resin 22 is pressed onto the optical prototype 1 with a release agent interposed therebetween, and then is detached in the procedures illustrated in FIG. 1 which are quite the same as the conventional ones. It is possible to manufacture an optical mold 20 on the surface of which the resin layer 22 having the shape corresponding to the optical prototype (FIG. 4B). After a layer 32 of a bonding agent or resin is formed on a base 31 having a convex surface and a layer 33 of chromium or copper + chromium is plated on said layer, said mold 20 is pressed onto said base to form a mold 30 having the convex surface which corresponds to the concave surface of said mold 20 and is therefore the same as the convex surface of the optical prototype. Optical concave surfaces can be reproduces by using said optical mold 30 in the same procedure as that illustrated in FIG. 3 (FIG. 4D).

Figure 6B:
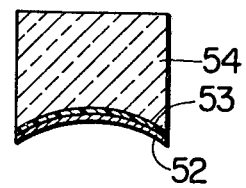

The reproducing processes for an optical convex surface will then be described with reference to FIG. 5A through FIG. 5C. On a base 41 having a concave surface, a layer 42 of bonding agent or resin is formed, and then another layer 43 is formed by plating chromium only or copper and chromium with a release agent interposed in the procedures similar to those illustrated in FIG. 4A through FIG. 4D. Then the base is pressed onto the optical prototype 1 so as to form an optical mold 40 having the concave surface corresponding to that of the optical prototype 1 (FIG. 5B). Optical surfaces as shown in FIG. 5C can be reproduced by using this optical mold. Now, another method for manufacturing the optical mold according to the present invention will be described below:

FIG. 6A and FIG. 6B illustrate the processes for manufacturing an optical mold having a concave surface for manufacturing optical convex surfaces. In FIG. 6A, the reference numeral 1 represents the optical prototype, the reference numeral 51 designates a plated layer of metal, for example, copper, the reference numeral 52 denotes a plated layer of metal, for example chromium, different from said metal 51, and the reference numeral 53 represents a layer of bonding agent or resin which serves to bond a base 54 consisting of a glass block having a concave surface to the plated layer 52. When the optical mold described above is dipped in a solution of sodium cyanide, the layer of copper 51 is dissolved and the upper layers are released. In this case, however, the layer of chromium 52 is not dissolved but is bonded by the bonding agent to the concave surface of the base 54 so as to form the concave surface corresponding to the convex surface of the optical prototype. An optical mold having a concave surface can be manufactured in this way.

Figure 7A:
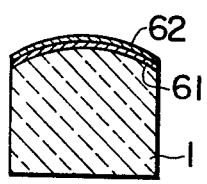
FIG. 7A through FIG. 7C show diagrams illustrating the method for manufacturing an optical mold having a convex surface according to the present invention.
Figure 7B:
Figure 7C:
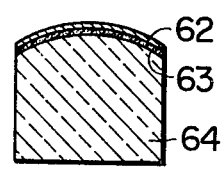

Then, processes for manufacturing an optical mold having a convex surface for reproducing optical concave surfaces will be described below:

Though an optical prototype having a concave surface can be prepared by the procedures similar to those illustrated in FIG. 6A and FIG. 6B, it is very difficult to prepare an optical mold having a non-spherical concave surface under the present technical circumstaces. It is therefore obliged to use an optical prototype having a convex surface for reproducing optical concave surfaces. In FIG. 7A, the reference numeral 1 represents an optical prototype similar to that shown in FIG. 6A, on the convex surface of which a plated layer of copper 61 is formed first, and then a plated surface of chromium 62 is arranged. When the layer of copper 61 is dissolved by dipping the optical prototype shown in FIG. 7A in a solution of sodium cyanide, the upper layer of chromium 62 is released as shown in FIG. 7B. By bonding this layer of chromium to a base 64 with bonding agent 63, an optical mold having a convex surface can be manufactured.

Though copper and chromium are used in the embodiments described above, it is possible to select different pairs of metals so long as one is easily dissolved and the other is not. In such cases, when a metal $M_1$ is brought in contact with an electrolytic solution, for example, sodium cyanide, in which direction the reaction to substitute said metal $M_1$ with ions $M_2$ of different metal ($M_1 + M_2^+ \rightleftarrows M_1^+ + M_2$) proceeds or whether or not the reaction to dissolve said metal $M_1$ with hydrogen ($M_1 + H \rightarrow M_1' + H$) takes place is dependent on type of metal, type of solution and concentration of ions concerned in said solution. However, the most important parameter is the ionization tendency, and the above-mentioned reaction is apt to proceed in the rightward direction as $M_1$ has higher ionization tendency. Further, metals having higher ionization tendency is selected as the metal to be dissolved or to be plated on an optical prototype.

As is easily understood from the foregoing descriptions, the optical mold according to the present invention has a sturdy standard surface which is in the corresponding shape to that of an optical mold since said surface is coated with a protective metal layer. Further, said optical mold permits easily releasing reproduced optical surfaces since a large differences in expansion coefficient is obtained between the metal and glass forming the release layers. The optical mold according to the present invention is advantageous for mass production of optical curved surfaces.

Furthermore, the present invention makes it possible to manufacture an optical mold having a precise surfacial metallic layer easily by forming two layers of different metals and dissolving one of said layers.

We claim:

1. A method for manufacturing an optical mold for reproducing optical curved surfaces in the shape corresponding to that of an optical prototype comprising: forming a first layer of a metal on an optical prototype, forming on said first layer a second layer of a metal different from said first layer of metal, dissolving said first layer for releasing said second layer from said optical prototype and bonding said released second layer onto the surface of a base.

2. A method for manufacturing an optical mold for forming optical curved surfaces in the shape corresponding to that of an optical prototype according to claim 1 wherein copper is used as said first metal and chromium is used as said second metal.

3. A method for manufacturing an optical mold for reproducing optical curved surfaces in the shape corresponding to that of an optical prototype comprising: forming a first layer of metal on the surface of an optical prototype, forming on said first layer a second layer of metal different from said first layer of metal, bonding a base onto said second layer of metal with a bonding agent interposed therebetween, and dissolving said first layer of metal for releasing said second layer of metal from said optical prototype.

4. A method for manufacturing an optical mold for reproducing optical curves surfaces in the shape corresponding to that of an optical prototype according to claim 3 wherein copper is used as said first metal and chromium is adopted as said second metal.

* * * * *